Sept. 27, 1966  C. V. STEVENSON  3,274,633
PORTABLE POWER CABLE CLEANER
Filed April 6, 1965  4 Sheets-Sheet 1
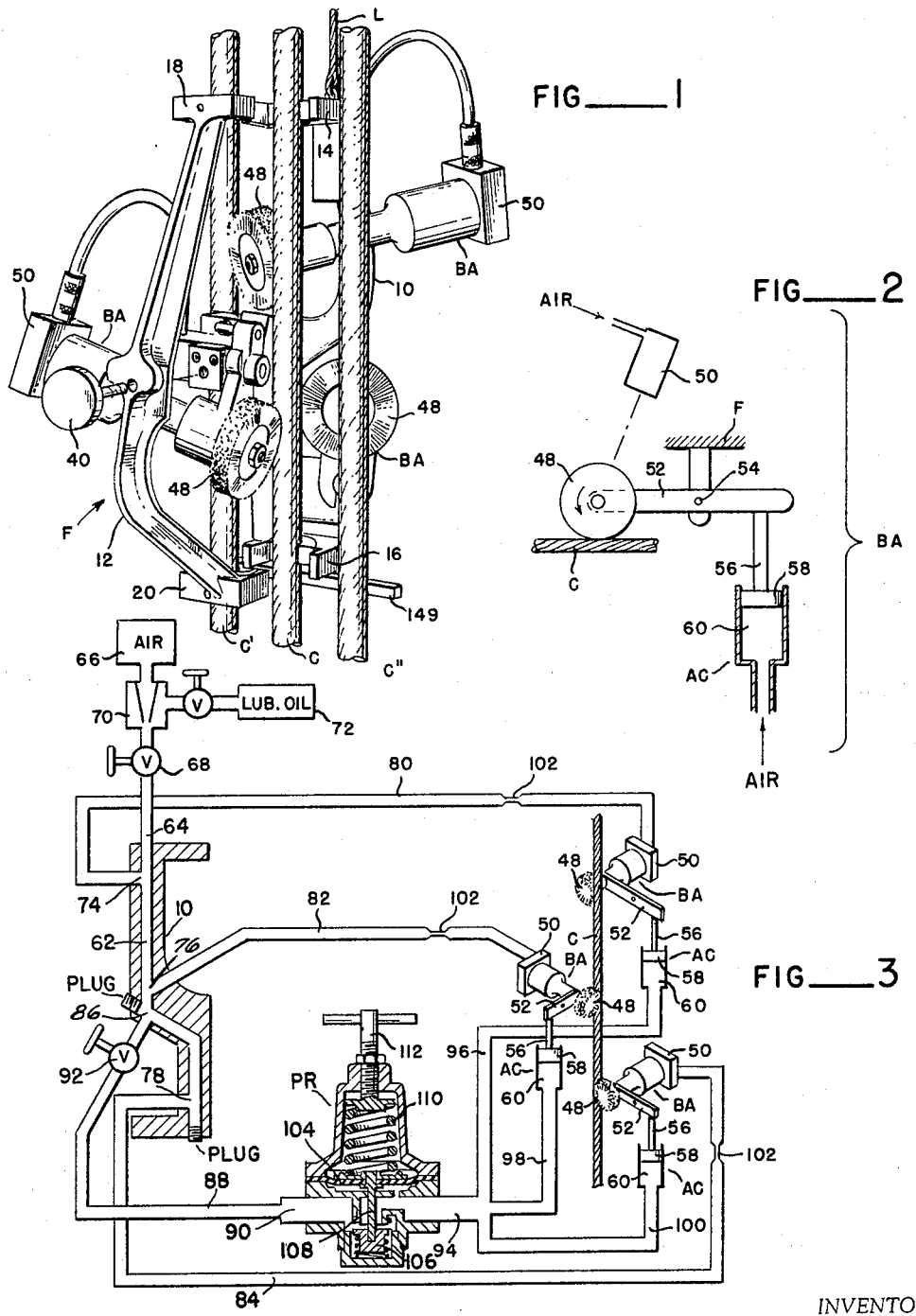
INVENTOR.
CLAIR V. STEVENSON
BY Graybeal, Cole & Barnard
ATTORNEYS Sept. 27, 1966    C. V. STEVENSON    3,274,633
PORTABLE POWER CABLE CLEANER
Filed April 6, 1965    4 Sheets-Sheet 2
FIG.___4
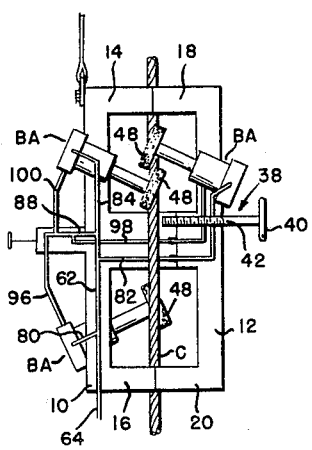
FIG.___5
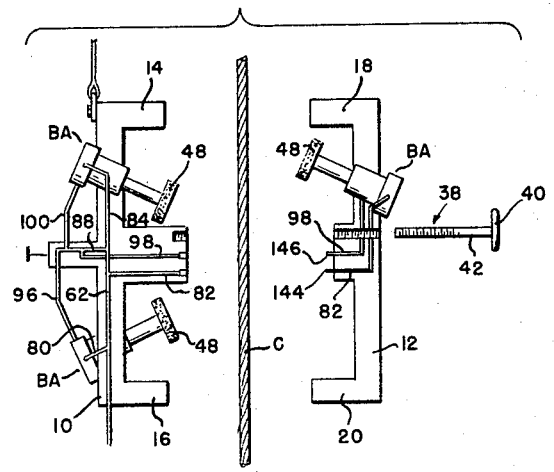
FIG.___9
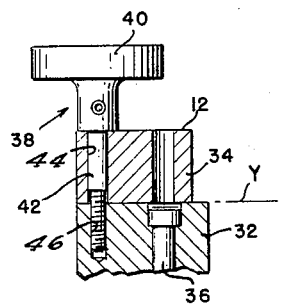
FIG.___10
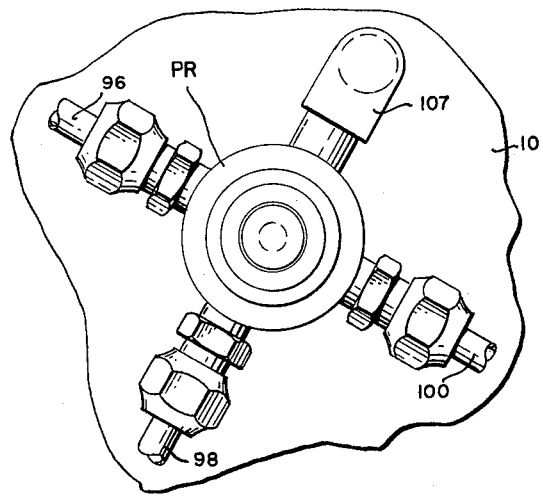
CLAIR V. STEVENSON
INVENTOR.
BY *Graybeal, Cole & Barnard*
ATTORNEYS

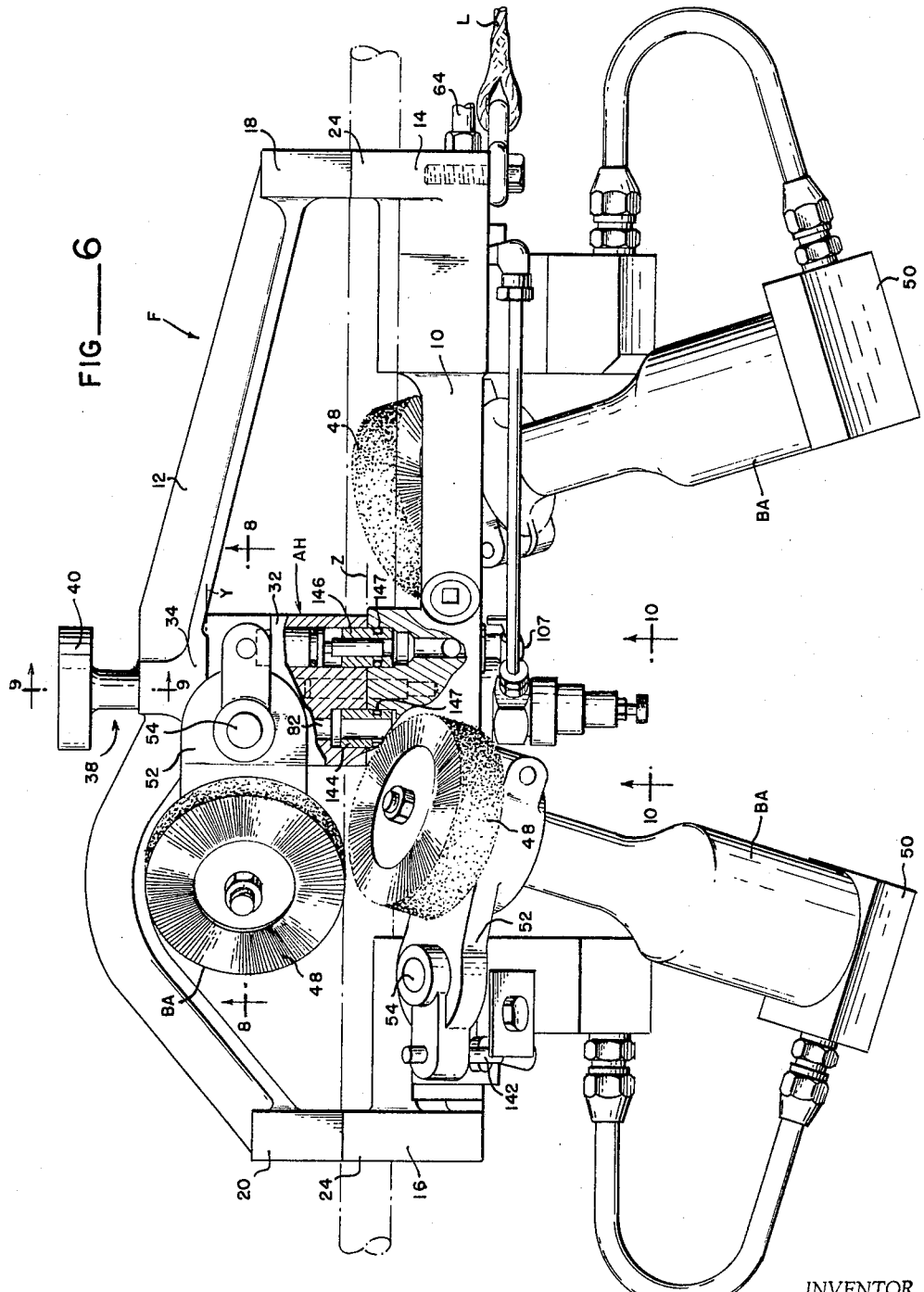

Sept. 27, 1966 C. V. STEVENSON 3,274,633
PORTABLE POWER CABLE CLEANER
Filed April 6, 1965 4 Sheets-Sheet 4
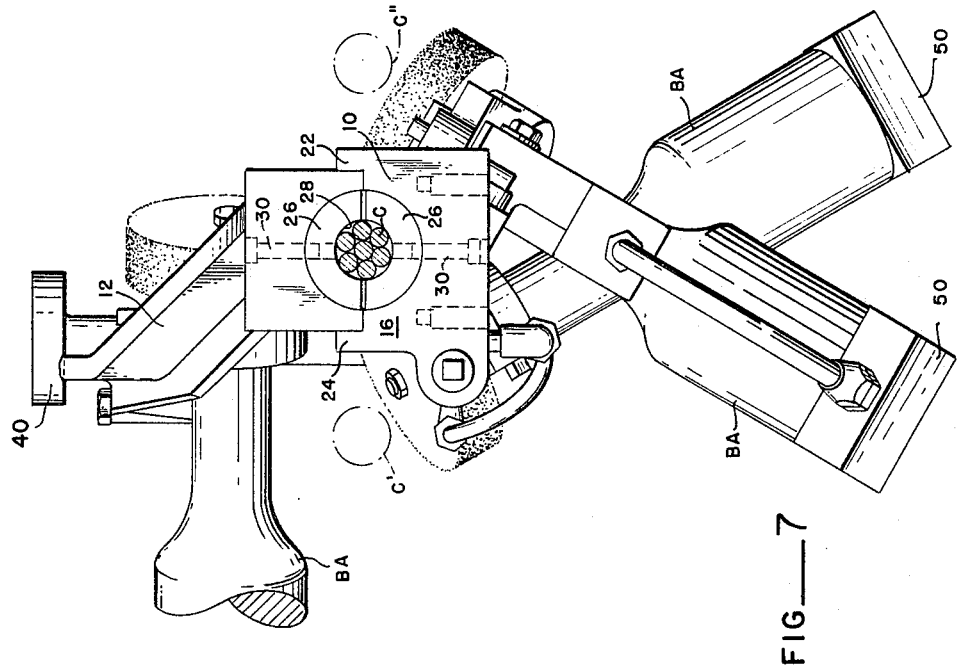
FIG—7
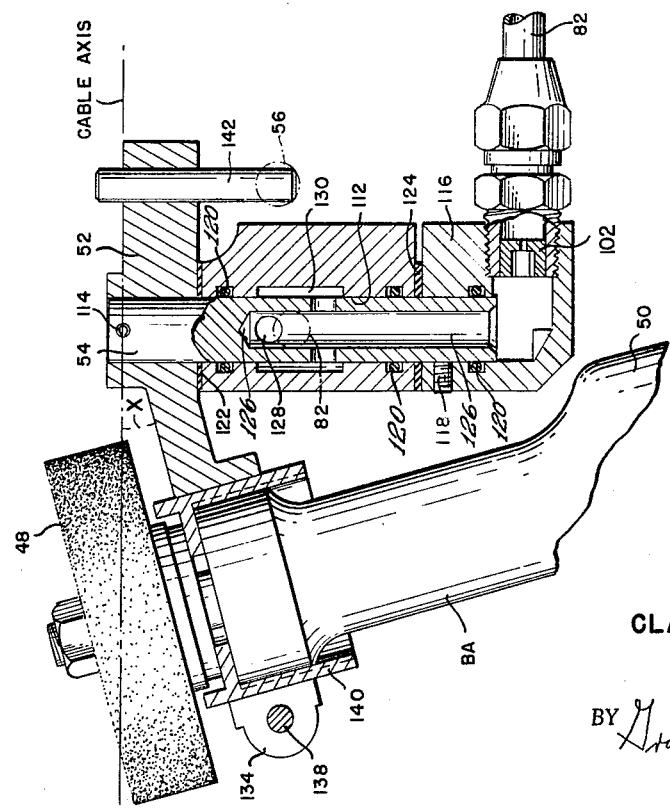
FIG—8
CLAIR V. STEVENSON
INVENTOR.
BY Graybeal, Cole & Barnard
ATTORNEYS United States Patent Office 3,274,633
Patented Sept. 27, 1966

3,274,633
PORTABLE POWER CABLE CLEANER
Clair V. Stevenson, Seattle, Wash., assignor to Cable-Clean Corporation, Seattle, Wash., a corporation of Washington
Filed Apr. 6, 1965, Ser. No. 445,993
24 Claims. (Cl. 15—88)

The present invention relates to cable cleaning mechanisms, and more particularly to portable power cable cleaning mechanisms adapted for heavy duty cleaning of fixed installation cables and the like.

In many usages, multi-strand cable, also termed wire rope, becomes quite fouled by dirt, old grease, grime and the like. Also, due to prolonged periods of nonuse, accompanied with direct exposure to the weather, such cable may acquire a coat of rust. The useful life of the cable may be increased by removing the old grease, etc., from the cable and then reconditioning it. In many instances, the nature of the usage renders it impractical or quite inconvenient to remove the cable from its position of use for cleaning. Typical examples of usages in this category include marine cables, bridge suspension cables, elevator suspension cables, well drilling and well operating suspension cables, and the like. It is a principal object of the present invention to provide a portable cable cleaning mechanism adapted to be readily installed on and removed from a cable to be cleaned, and to be moved relatively lengthwise along the cable for cleaning same, while the cable remains in its position of use.

The cable cleaning mechanism of the present invention is characterized essentially by a two part frame that is readily assemblable on and removable from the cable to be cleaned, at any desired location thereon, so that threading of the end of the cable through the mechanism is unnecessary. At least one but preferably three brush assemblies are mounted on the frame, and each includes a rotary, bristle (preferably wire) brush, motor means for rotating the brush, and means for putting and maintaining said brush in substantially unyielding contact with the cable during the cleaning operation. The brushes are spaced circumferentially around the cable to be cleaned, and are disposed so as to rotate diagonally across such cable.

According to the present invention, air motors are used for rotating the bristle brushes, and the means for maintaining the brushes in substantially unyielding contact with the cable consists of an air cylinder or pneumatic actuator for each brush assembly. Each brush assembly is mounted onto an end of an elongated motor arm that in turn is pivotally mounted near its middle onto the frame. The placement and mounting of each motor arm is such that pivotal movement of the arm causes the rotary brush which it carries to be swung either towards or away from the cable, along an arcuate path. Each air cylinder means is arranged to push against the end portion of its motor arms that is distal the rotary brush, and in a direction away from the cable. The brushes make a yieldable contact with the cable when no air is being delivered to the air cylinders, and they can be individually rocked outwardly by hand as necessary, so that they can be wiggled around the cable during installation or removal of the mechanism from the cable. However, when air is delivered to the air cylinder means the brushes are forceably urged by the air cylinder means and the motor arm into a substantially unyielding contact with the cable.

To facilitate assembly of the mechanism on the cable, the frame is longitudinally divided into two separable, elongated frame members. Each frame member includes a pair of end blocks, each of which is abuttingly engageable with a corresponding end block on the other frame member. The end blocks preferably carry complementary components of a pair of split form cable guides. In the preferred form of the invention, a single, knob-headed bolt is used for securing the two frame members together, with the cable guide means and the rotary bristle brushes in a cable encompassing position. Each frame member includes an intermediate block that is abuttingly engageable with the intermediate block of the other frame member when the two frame members are assembled. The knob-headed bolt includes a threaded shank portion that extends through an opening formed in the intermediate block of one of the frame members and then screws into an internally threaded bore formed in the intermediate block of the other frame member.

One of the frame members may be bored or otherwise formed to provide therein an internal air manifold or trunk conduit, forming a part of the air distribution system. According to the present invention, a separate conduit leads from the manifold to each air motor, and another conduit leads therefrom to a pressure regulator. The outlet of the pressure regulator is connected to each of the air cylinder means by separate conduits. A restricted orifice is provided in each of the conduits leading to a motor, so that the air demand of the motors does not cause a drop in pressure in the manifold below the demand of the air cylinder means.

These and other features, advantages, objects and capabilities of cable cleaning mechanisms constructed according to the present invention will be apparent from the following description of a typical form thereof, taken together with the accompanying illustrations, wherein like numerals refer to like parts, and wherein:

FIG. 1 is a perspective view of a form of the invention, showing one of the frame members removed from and in spaced relation to the other frame member;

FIG. 2 is a schematic view of one of the three rotary brush units which characterize the cable cleaning machine of the present invention, such view diagrammatically illustrating the preferred manner in which the rotary brush is positively urged against the cable;

FIG. 3 is a schematic view involving all three brush units, and showing the air distribution system;

FIG. 4 is an assembled view, somewhat diagrammatic in nature, of a modified frame construction, and of the arrangement of the brush assemblies and the air distribution system thereon;

FIG. 5 is a view similar to FIG. 4, but showing the frame components detached and in a spaced relation to each other;

FIG. 6 is a view in elevation of a preferred embodiment of the invention, with some parts being shown in section;

FIG. 7 is a bottom plan view of the mechanism shown by FIG. 6;

FIG. 8 is a fragmentary view, partly in section and partly in elevation, showing the preferred way of mounting the air motor units onto the frame, with the sectional part of the view being taken substantially along line 8—8 of FIG. 6;

FIG. 9 is a sectional view taken substantially along line 9—9 of FIG. 6, showing the preferred manner of connecting the two frame members together; and FIG. 10 is a fragmentary view taken towards the central portion of the larger frame member, in the vicinity of where the pressure regulator taps into the air manifold.

Turning to a specific consideration of the several figures of the drawing, the illustrated form of cable cleaning mechanism is shown to include a frame F (of free form) composed of separable first and second frame members 10, 12. Frame member 10 is formed to include a pair of end blocks 14, 16 adapted to abuttingly engage a related pair of end blocks 18, 20 formed on frame member 12. The end blocks 14, 16 may include a pair of laterally spaced, inwardly extending projections 22, 24 between which the end blocks 18, 20 are retained when the two frame members 10, 12 are assembled together.

Preferably, the inboard edge portions of the end blocks 14, 16, 18, 20 are formed to include cut-out portions for receiving generally semiannular cable guide inserts 26. The cable guide inserts 26 that are associated with end blocks 14, 18, complement each other and together form a split form cable guide at their end of frame F. Similarly, the guide inserts 26 associated with end blocks 16, 20 form a split form cable guide at the opposite end of the frame F. When assembled, the cable guides each include a central guiding bore 28, sized to be only slightly larger than the cable diameter. The guide inserts may be removably secured in place by bolts 30. As shown in FIG. 7, such bolts 30 may extend through bores formed in the end blocks 14, 16, 18, 20, and then thread into the inserts 26. Several sets of the guide inserts, differing in guide bore size only, may be made available so that the mechanism can be readily adapted to whatever size of cable is presented by merely substituting in the proper size of guide inserts 26.

The frame members 10, 12 preferably also include mating intermediate blocks 32, 34, respectively. Block 32 associated with frame member 10 is preferably secured to the frame member 10 by a single bolt 36 that first extends through block 32 and then threads into an intermediate portion of the frame member 10 (FIG. 9). A single bolt 38 having an enlarged, knob-like head 40 (hereinafter sometimes referred to as a "knob") may be provided as a sole means for securing the two frame members 10, 12 together. The shank portion 42 of such bolt 38 is shown to extend through a bore 44 formed in block 34 and then thread into an internally threaded bore 46 formed in block 32. Thus, the frame members 10, 12 may be easily and quickly assembled and disassembled by a simple manipulation of the knob 40. When the frame members 10, 12 are assembled together, end blocks 14, 18 abut together, and end blocks 16, 20 abut together. The projections 22, 24 prevent relative lateral movement of the end blocks, and bolt 38 clamps the two frame parts together and prevents relative endwise movement of same.

The illustrated embodiment of the invention includes three brush assemblies BA mounted on the frame F. As diagrammatically illustrated in FIG. 2, each brush assembly BA includes a rotary bristle (e.g., wire) brush 48 and an air motor 50 for rotating same. By way of typical and therefore non-limitative example, the air motor 50 may be of the vane type, such as made by the Chicago Pneumatic Tool Motor, under Model No. CP–3221 P–6999AY (with air inlet block). The air motor unit 50 is mounted at one end of a motor arm 52. The motor arm 52 is pivotally connected to the frame F by a pivot means 54 connecting to said arm 52 at a point intermediate its ends. The end of motor arm 52 opposite the motor unit 50 is contactable by an actuator 56 that is operatively connected to a piston 58 forming a part of an air cylinder unit AC. The actuator 56 is arranged to push the motor arm 52 in a direction away from the cable C. As is evident, the delivery of compressed air into cylinder chamber 60 will cause piston 58 to move the actuator 56 against the end of motor arm 52. This causes the motor arm 52 to rock about the pivot means 54, and the motor unit end to swing toward the cable C, and puts the brush 48 in contact with the cable C. Preferably, a sufficient amount of air pressure is delivered to air cylinder chamber 60 to maintain the brush 48 in a substantially unyielding contact with the cable C throughout the cleaning operation.

Preferably, frame member 10 is drilled out so as to form therein an air manifold 62 forming a part of the air distribution system for the brush assemblies BA. As shown in FIG. 3, the air manifold 62 may consist of a plurality of intersecting drilled passageways. An air supply line 64 brings compressed air from an air source 66, e.g., an air compressor, to one end of the air manifold 62. A suitable type of on-off valve 68 is provided in air supply line 64. Also, air supply line 64 may include a jet or ejector pump 70 arranged to pull a small amount of lubricating oil from a source 72 into the supply line 64, to be carried by the air to the air motors 50 for lubricating same.

The air manifold (or trunk conduit) 62 is tapped into at stations 74, 76, 78 to provide take off ports for branch conduits 80, 82, 84, respectively, leading to the air motors 50 of the brush assemblies BA.

Air manifold 62 is also tapped into at station 86 to provide a take off port for a branch conduit 88 leading from the air manifold 62 to the inlet 90 of a pressure regulator PR. As illustrated, an off-on valve 92 may be provided in conduit 88. The outlet 94 of the pressure regulator PR is connected to the cylinder chambers 60 of the air cylinder means AC for the brush assemblies BA by branch conduits or lines 96, 98, 100, respectively.

A flow restricting orifice 102 is provided in each conduit 80, 82, 84 ahead of the inlets to the air motors 50. As will be evident, the orifices 102 serve to maintain a sufficient amount of air pressure in the manifold 62 to meet the demands of the air cylinder actuator units AC.

By way of typical and therefore nonlimitative example, the pressure regulator PR may be of the type manufactured by the Norgren Company, such as the Norgren Model No. 20AR–1G. The working elements of such a pressure regulator consist mainly of a flexible diaphragm 104 which controls a valve plug 106 through an interconnecting valve pin 108, and an adjusting spring 110 which is loaded by means of an adjusting screw 112. The pressure side of the diaphragm is connected to the outlet 94 of the regulator so that regulated pressure will be exerted against the diaphragm 104. As the adjusting screw 112 is turned in, it applies a load to the adjusting spring 110 which is transmitted to the valve plug 106 through the diaphragm 104 and the valve pin 108, thus opening the valve. As the regulated pressure increases, the pressure against the diaphragm 104 also increases, forcing the diaphragm 104 to compress the adjusting spring 110 until the load exerted by the adjusting spring 110 is equal to the load exerted by the regulated pressure. A state of equilibrium will occur with the valve open just the amount necessary to compensate for the demand, thus maintaining the desired regulated pressure. In this manner, the regulated pressure is maintained at a substantially constant level, i.e., it will remain substantially unchanged even with a widely fluctuating primary pressure in the air manifold 62.

Referring now to FIGS. 6 and 10, conduit 88 may include an elbow 107 connected at one of its ends to frame member 10 and at its other end to the inlet port 90 of the pressure regulator PR. The conduits 96, 98, 100 may comprise pieces of copper tubing leading from a multiple ported outlet formed in the pressure regulator PR to the air cylinder blocks 32 of the brush assemblies BA. As best shown by FIG. 6, wherein block 32 is partly in section, the blocks 32, 108, 110 house the air cylinder means AC and also include a part (drilled passageways) of the air motor conduits 80, 82, 84.

As clearly shown by FIG. 8, the outer portion of each block 34 forms a bushing for the associated shaft or pivot means 54. In each assembly, a bore 112 is formed through the bushing, generally perpendicular to the axis of the cable. A portion of the shaft 54 extends outwardly of each end of the bushing. The motor arm 52 is affixed to the inboard end portion of the shaft 54, such as by a roll pin 114, for example, and a rotatable elbow block 116 is affixed to the opposite end of the shaft 54, such as by a set screw 118, or the like. Thus, the bushing is relatively fixed, and the motor arm 52, the shaft 54, and the elbow block 116 rotate together relative thereto. O-rings 120 are provided between the fixed and movable parts to seal against leakage. A first spacing washer 122 may be provided between the bushing and the motor arm 52, at the inboard end of shaft 54, and a second washer 124 may be provided between the bushing and the elbow block 116, at the outboard end of the shaft 54. A blind bore 126 drilled into the outboard end of shaft 54, communicates, through a plurality of transverse ports 128 near its inboard end, with an enlarged annular chamber 130 formed in the bushing in concentric surrounding relation to the shaft 54. As indicated by broken line in FIG. 8, the upstream portion of conduit 82 (constituting a port drilled partly in frame member 12 and partly in block 32) enters into the annular chamber 130 substantially perpendicularly to the axis of shaft 54. A flexible conduit, also forming a part of conduit means 82, taps into the oulet end of elbow block 116 and leads to the inlet of the air motor 50. The restricted orifice 102 may consist of an insert member fittable into one end of flexible conduit 132, and having a drilled wall portion. The orifice size may be changed by merely replacing the insert with another insert having therein an orifice of a different size. Alternatively, a variable diameter restriction may be provided in conduit means 82 between elbow block 116 and the inlet of the motor.

As illustrated, one end of motor arm 52 extends diagonally outwardly from shaft 54, at an angle X relative to the axis of the cable C. This angle also represents the angle at which the brush 48 is set relative to the cable, and the angle that the winds of the cable make relative to the cable axis. End portion 134 of motor arm 52 constitutes a clamp by which the motor unit (motor 50 and brush 48) are attached to the motor arm 52. Such clamp is of the split collar type and includes a pair of ears on opposite sides of the split through which a clamping screw 138 extends. An elongated sleeve 140 of hardened metal is affixed to the inboard end of the motor housing, and provides an elongated cylindrical section on which the clamp may act. The clamp provides a means for adjusting the brush 48 in and out relative to cable C, along its axis of rotation. This type of adjustment makes it possible to use rotary brushes of several different sizes and shapes.

The end of motor arm 52 distal the brush 48 may be provided with a pin 142 that extends generally parallel to the shaft 54. As shown by broken line in FIG. 8, the actuator 56 of the air cylinder means AC contacts a projecting end portion of such pin 142 and in that manner rotates the motor arm 52. Preferably, the center to center spacing of the shaft 54 and pin 142 is smaller than the center to center spacing of the shaft 54 and the brush 48. Thus, any given displacement or throw of the actuator 56 will produce an appreciably larger displacement of the brush 48. When the actuator 56 is retracted a substantial gap exists between the pin 142 and the face of the air cylinder block from which the actuator 56 projects. This allows the brush 48 to be swung outwardly an appreciable amount so that it can be wiggled around the cable during installation or removal of the mechanism from the cable.

In a modified form of cable cleaning mechanism according to the invention, the outboard portion of block 32 is bolted to frame member 12 rather than frame member 10, and the centrally mounted brush assembly BA stays with frame member 12 when the two frame members are separated. Thus, abutting contact and separation occurs at plane Z, rather than at plane Y (FIG. 6). Under separation of the frame members 10, 12, the inboard ends of sleeves 144, 146 are pulled out of engagement by their respective sockets formed in the intermediate portion of frame member 10. As is evident, when the mechanism is put back together the two sleeves 144, 146 merely plug back into their respective socket openings, so as to complete or again make continuous the branch conduits of which they are a part. O-rings 147 are provided for sealing between the separable conduit parts. This arrangement makes it possible to separate the frame members without disconnecting or uncoupling any screw-type connectors, or the like. As in the case of the preferred embodiment, all it takes to remove frame member 12 from frame member 10 is a simple rotation of the knob-headed bolt 38, and then a pull on the two frame members 10, 12 to move them part. The advantage of this modified arrangement over the arrangement wherein all three brush assemblies are mounted on the same frame member is that it permits installation of the cable cleaning mechanism onto a cable that is more closely flanked by the adjacent cables. It is not necessary to wiggle one of the brush assemblies between the cable to be cleaned and an adjacent cable in order to install the mechanism on the cable to be cleaned. Rather, the frame member 10 and the brush assemblies BA carried thereby are brought to the cable to be cleaned from one side thereof, and the frame member 12 and its brush assembly BA are brought thereto from the opposite side, with it being unnecessary to pass one of the brush assemblies between the cables to be cleaned and an adjacent cable.

As shown in FIG. 1, a stabilizing means in the form of a transverse bar 149, for example, may be secured to one end of the cable cleaning mechanism so as to extend laterally therefrom and rest against the two cables C', C'' which flank the cable C to be cleaned, for preventing the mechanism from being rotated about the cable which it follows by the torque of the air motors. Alternatively, the stabilizer may consist of an arm extending from the mechanism over to only one of the adjacent cables, with such arm having an eye or hook at its end which engages such adjacent cable.

As shown in FIGS. 1 and 6, at least one hauling eye may be secured to an end of the frame F, by a bolt or the like, to which can be tied a hauling lanyard L by means of which the mechanism can be moved along the cable C being cleaned. Preferably, the mechanism forming the subject matter of U.S. Patent No. 3,116,811, issued January 7, 1964, to Clair V. Stevenson, is arranged on the cable C to follow the mechanism of the present invention, and may be physically connected thereto so that one lanyard tows both. The cable cleaning mechanism of the present invention gives the cable a first "rough clean" by its power-driven brushes 48. The mechanism of said Patent No. 3,116,811 then gives the cable a final cleaning and lubricant thereto. As disclosed, such mechanism of Patent No. 3,116,811 uses gas pressure for force feeding the lubricant from a storage tank to its points of application. When the two mechanisms are used together, a conduit may be led from the air source 66 to such lubricant tank to provide the pressure for pressure feeding the lubricant to the cable.

Although the cable cleaning mechanism of the present invention has been described and illustrated as a portable device, adapted to be moved relatively along a fixed installation cable, it will be apparent that such mechanism could be mounted onto a stand, in a horizontal position, for example, and advantageously used in that manner, with the cable to be cleaned being moved relatively through it. This type of operation is particularly suitable for use by salvaging companies which collect used cables and bring them to their yards for reconditioning and resale.

As herein used, the expression, "substantially unyielding contact with the cable" means a contact of a type wherein the bristles of the brushes always touch the cable, and cut into old grease and dirt in the crevices of the cable, and the brushes are displaced outwardly only by irregularities in the size and shape of the cable, and then only a slight amount.

A particularly important characteristic and feature of the illustrated embodiments of the invention is that all three of the air cylinder blocks (including the bushing) are identical in construction and are interchangeable, each with the other.

Accordingly, these as well as other such modifications, adaptations and modes of utilization of the cable cleaning mechanism of the present invention will occur to those skilled in the art to which the invention is addressed, within the scope of the invention as defined by the following claims.

What is claimed is:

1. A cable cleaning mechanism comprising: a frame including guide means for engaging a cable; an elongated brush assembly including a rotary, bristle brush at one end and air motor means for rotating said brush at the other end; means mounting said brush assembly onto said frame, said means permitting yieldable engagement of said brush with the cable, and said means comprising a motor arm, means pivotally attaching said motor arm to said frame, for pivotal movement about an intermediate point on said arm and closely adjacent the cable, and means mounting the brush assembly onto said arm, at a location on the brush assembly between the bristle brush and the air motor means, and at a location on the motor arm offset to one side of the pivot point; air cylinder means for urging said brush assembly towards said cable, and in this manner urging the brush into contact with the cable, said air cylinder means including an actuator rod that is extendable in a direction away from the cable, and is positioned to push on said motor arm at a location thereon offset to the side of said pivot point that is opposite the brush assembly; a source of compressed air; and conduit means delivering compressed air from said source to both the air motor means, for rotating said brush, and to the air cylinder means, for urging said brush into contact with the cable.

2. A cable cleaning mechanism comprising: a frame including guide means for engaging a cable; a brush assembly including a rotary, bristle brush and air motor means for rotating said brush; means mounting said brush assembly onto said frame, said means permitting yieldable engagement of said brush with the cable; air cylinder means for urging said brush assembly toward said cable, and in this manner urging the brush into contact with the cable; a source of compressed air; and conduit means delivering compressed air from said source to both the air motor means, for rotating said brush, and to the air cylinder means, for urging said brush into contact with the cable, with said conduit means including a trunk conduit carried by the frame and leading from the source of compressed air, a branch conduit leading from said trunk conduit to said air cylinder means, and a branch conduit leading from said trunk conduit to said air motor means, and with said latter branch conduit including a relatively small diameter pressure control orifice, for maintaining sufficient air pressure in the trunk conduit for actuating the air cylinder means.

3. A cable cleaning mechanism according to claim 2, wherein the bristle brush is mounted to rotate diagonally across the cable.

4. A cable cleaning mechanism adapted to be moved lengthwise along a cable, for cleaning same, said mechanism comprising: a frame including guide means for engaging a cable; a plurality of brush assemblies, each including a rotary, bristle brush and an air motor for rotating said brush; means mounting said brush assemblies onto said frame at different locations circumferentially about the cable, so that the bristle brushes contact the cable at circumferentially spaced locations thereon, said means permitting yieldable engagement of the bristle brushes with said cable; an air cylinder means connected with each said brush assembly for urging same toward the cable, and in that manner urging the bristle brush of such assembly into contact with the cable; a source of compressed air; a trunk conduit carried by said frame; conduit means for delivering compressed air from said source to the trunk conduit; a separate branch conduit leading from the trunk conduit to each air motor, for delivering compressed air from the trunk conduit to the air motors; pressure regulator means for maintaining a substantially constant regulated pressure, said pressure regulator means having an inlet and an outlet; a branch conduit leading from the trunk conduit to the inlet of the pressure regulator means; and a separate branch conduit leading from the outlet of the pressure regulator means to each air cylinder means, for delivering regulated compressed air to the air cylinder means.

5. A cable cleaning mechanism according to claim 4, wherein a relatively small diameter pressure control orifice is provided in each branch conduit leading from the trunk conduit to an air motor, for maintaining a sufficient air pressure in the trunk conduit to supply the demand of the air cylinder means.

6. A cable cleaning mechanism according to claim 4, wherein each bristle brush is mounted to rotate diagonally across the cable.

7. A cable cleaning mechanism according to claim 4, wherein the means for mounting each brush assembly onto the frame includes an elongated motor arm having two ends, means pivotally attaching said motor arm to the frame, for pivotal movement about a point intermediate its ends, and means mounting the brush assembly onto one end of said arm, and wherein each air cylinder means includes an actuator rod that is extendable in a direction away from the cable, and is positioned to push upon its motor arm on the end thereof opposite to the end on which the brush assembly is mounted, so that a push on the motor arm by the actuator rod will rotate the opposite end of the rod toward the cable and urge the bristle brush against the cable.

8. A cable cleaning mechanism adapted to be moved lengthwise along a cable, for cleaning same, said mechanism comprising: a frame composed of a pair of separable frame members, and including a split form cable guide for loosely engaging the cable, said guide being formed by complementary guide components separately carried by the frame members, and means for securing the two frame members together in a cable encompassing position; a brush assembly including a rotary, bristle brush and a motor for rotating said brush; means mounting said brush assembly onto one of said frame members in such a manner that the bristle brush thereof normally makes yieldable contact with said cable; adjustable means for exerting a positive, substantially unyielding force on said brush assembly, for urging same toward the cable, and in that manner maintaining the bristle brush in substantially unyielding contact with the cable; and means for moving said mechanism relatively along the cable.

9. A cable cleaning mechanism according to claim 8, wherein the motor for rotating said brush is an air motor, the adjustable means for urging the brush assembly toward the cable consists of an air cylinder means, and said mechanism includes a source of compressed air, and conduit means for delivering compressed air from said source to both the air motor, for rotating the bristle brush, and to the air cylinder means for urging said brush into contact with the cable, with said conduit means including valve means for varying the pressure of the compressed air delivered to the air cylinder means, thereby making said air cylinder means adjustable.

10. A cable cleaning mechanism according to claim 8, further including at least one additional brush assembly, with rotary bristle brush and motor for rotating said brush; means mounting said additional brush assembly onto the second frame member, in a position such that the brush thereof makes contact with the cable at a location circumferentially spaced about the cable from the brush of said first brush assembly, with the bristle brush of said additional brush assembly normally yieldably contacting the cable; and adjustable means for exerting a positive, substantially unyielding force on said brush assembly, for urging same toward the cable so as to put and maintain the bristle brush in substantially unyielding contact with the cable.

11. A cable cleaning mechanism according to claim 10, wherein the motors for rotating the brushes consists of air motors, the adjustable means for urging the brush assemblies toward the cable consists of a separate air cylinder means for each brush assembly, and said mechanism includes a source of compressed air, an air manifold carried by one of said frame members, conduit means for delivering compressed air from said source to said air manifold, and separate conduit means for delivering compressed air from said manifold to the two air motors, for rotating the bristle brushes, and to the air cylinder means, for urging said brushes into contact with the cable, with the conduit means leading from the manifold to the other frame member being separable and including a first part carried by the frame member with the manifold, and a second part carried by the other frame member, with said separable parts coming together and forming continuous flow paths for the compressed air when the two frame members are assembled together.

12. A cable cleaning mechanism according to claim 8, further including at least one additional brush assembly, with rotary bristle brush and motor for rotating said brush; means mounting said additional brush assembly onto the same frame as the first brush assembly, in a position such that the brush thereof makes contact with the cable at a location circumferentially spaced around the cable from the brush of said first brush assembly, with the bristle brush of said additional brush assembly normally yieldably contacting the cable; and adjustable means for exerting a positive, substantially unyielding force on said brush assembly, for urging same toward the cable so as to put and maintain the bristle brush in substantially unyielding contact with the cable.

13. A frame composed of a pair of separable frame members, and including a split form cable guide for loosely engaging the cable, said guide being formed by complementary guide components separately carried by the frame members, and means for securing the two frame members together in a cable encompassing position; at least one brush assembly associated with each frame member, each brush assembly including a rotary bristle brush and an air motor for rotating said brush; means mounting each brush assembly onto its frame member in a position so that its bristle brush is spaced circumferentially around the cable from the bristle brush of the other brush assembly, with each mounting means permitting the bristle brush of its brush assembly to normally make a yieldable contact with the cable; an air cylinder means on each frame member for urging the brush assemblies toward said cable, and in that manner urging the brushes into contact with the cable; an air manifold on one of said frame members; means supplying compressed air to said air manifold; conduit means delivering compressed air from said manifold to the air motor of the brush assembly on the frame member with the air manifold; pressure regulator means for maintaining a substantially constant regulated pressure, said means being connected to the frame member with the air manifold, and having an inlet and an outlet; a first jointed conduit interconnecting between the air manifold and the air motor on the second frame member, for delivering compressed air to such motor, said jointed conduit including a first part carried by one of said frame members, and a second part carried by the other frame member, with the ends of said two parts mating when the two frame members are assembled; and a second jointed conduit interconnecting between the outlet of the pressure regulator means and the air cylinder means on the second frame member, for delivering regulated compressed air to such air cylinder means, said jointed conduit also including a first part carried by one of said frame members, and a second part carried by the other frame member, with the ends of said two parts mating when the two frame members are assembled.

14. A cable cleaning mechanism according to claim 13, wherein the means for securing the two frame members together in a cable encompassing position consists of a single bolt having a shank portion and a head portion, with the shank portion extending through an opening in the second frame member and threading into an internally threaded socket formed in the frame member with the manifold, and with the head portion of said bolt abutting against the second frame member.

15. A cable cleaning mechanism adapted to be moved lengthwise along a cable, for cleaning same, said mechanism comprising: a frame composed of a pair of separable frame members of elongated form, and means for clamping said frame members together, each such frame member including a block at each of its ends that abuts the corresponding block on the other frame member when the frame members are together, with each end block including recess means for forming together with a complementary recess formed in the end block with which it is paired, a cable encompassing guide, when the frame members are together; cable cleaning brush means mounted on said frame, and including a rotary bristle brush, motor means for rotating said brush, and means for maintaining said brush in substantially unyielding contact with the cable; and means for moving said mechanism relatively along the cable.

16. A cable cleaning mechanism according to claim 15, wherein one end block of each pair includes a pair of laterally spaced projections between which the other end block of such pair is snugly accommodated when the two frame members are together.

17. A cable cleaning mechanism according to claim 15, wherein each frame member also includes a block intermediate its ends that abuts the intermediate block of the other frame member when the frame members are together, and the means for clamping said frame members together consists of a bolt having a shank portion and a head portion, with said shank portion extending through an opening in the intermediate block of one of said frame members and threading into an internally threaded bore formed in the intermediate block of the other frame member.

18. A cable cleaning mechanism comprising: a frame including guide means through which the cable may extend; a brush assembly including a rotary, bristle brush, and air motor means for rotating said brush; means mounting said brush assembly onto said frame, said means comprising a bushing secured to said frame, a shaft journaled for rotation in said bushing and having an end portion projecting outwardly from said bushing, a motor arm secured to said shaft and having a first portion projecting outwardly to one side of said shaft and a second portion projecting outwardly to the opposite side of said shaft; means mounting said brush assembly onto the first portion of said motor arm; air cylinder means mounted on said frame, and including an actuator rod that is extendable in a direction generally away from said cable, and is positioned to push on the second portion of said motor arm when it is extended, so as to rock the motor arm and cause the bristle brush to be moved against the cable; a source of compressed air; and conduit means delivering compressed air from said source to both the air motor means, for rotating said brush, and to the air cylinder means, for extending said actuator rod, and in that manner urge the brush into contact with the cable.

19. A cable cleaning mechanism according to claim 18, wherein the brush assembly includes a motor casing having a neck portion, and the means mounting said brush assembly onto the first portion of the motor arm includes a clamp means surrounding said neck portion, through which the said casing is axially movable for adjustment in position of the bristle brush, and by which said casing may be clamped to the motor arm.

20. A cable cleaning mechanism according to claim 18, wherein said conduit means includes an air manifold carried by the frame, and air line means leading from the manifold to and into the bushing, then through a longitudinal passageway formed in said shaft, and then from an outlet provided in the bushing, through another air line to the air motor.

21. A cable cleaning mechanism according to claim 20, wherein a relatively small diameter pressure control orifice is provided in such portion of the conduit means leading from the manifold to the air motor, for maintaining sufficient air pressure in the manifold for meeting the demand of the air cylinder means.

22. In combination with a cable to be cleaned, and at least one adjacent cable, a cable cleaning mechanism adapted to be moved along said cable to be cleaned, for cleaning same, said mechanism comprising: a frame composed of a pair of separable frame members, and including a split form cable guide for loosely engaging the cable to be cleaned, said guide being formed by complementary guide components separately carried by the frame members, and means for securing the two frame members together in a cable encompassing position; a brush assembly including a rotary bristle brush and a motor for rotating said brush; means mounting said brush assembly onto said frame in such a manner that the bristle brush thereof normally makes yieldable contact with said cable to be cleaned; means for exerting a positive, substantially unyielding force on said brush assembly, for urging same toward the cable to be cleaned, and in that manner putting and maintaining the bristle brush in substantially unyielding contact with the cable to be cleaned; means for moving said mechanism relatively along the cable to be cleaned; and guide means reactable against said adjacent cable for preventing the mechanism from rotating about the cable to be cleaned in response to torque and reaction forces produced by the rotary brush.

23. A cable cleaning mechanism according to claim 22, further including a second cable extending adjacent the cable to be cleaned, on the side thereof opposite the first adjacent cable, wherein the means for preventing rotation of the cable cleaning mechanism about the cable to be cleaned comprises a bar extending crosswise of the frame and contacting both of the adjacent cables.

24. A cable cleaning mechanism comprising: a frame; a plurality of brush assemblies, each including a rotary, bristle brush and an air motor for rotating said brush; means mounting said brush assemblies onto said frame at different locations circumferentially about the cable position, so that the brushes contact the cable at circumferentially spaced locations thereon, said means permitting yieldable engagement of the bristle brushes with said cable; an air cylinder means connected with each said brush assembly for urging same toward the cable, and in that manner urging the bristle brush of such assembly into contact with the cable; a source of compressed air; conduit means for delivering compressed air from said source to each air motor and to each air cylinder means; and pressure control means in said conduit means for maintaining sufficient air pressure in said conduit means for actuating the air cylinder means during air delivery to the air motors.

References Cited by the Examiner

UNITED STATES PATENTS

| | | | |
|---|---|---|---|
| 1,647,499 | 11/1927 | Bly | 15—88 |
| 2,858,555 | 11/1958 | Medovick | 15—88 |
| 2,888,694 | 6/1959 | Betzel | 15—88 |
| 2,960,706 | 11/1960 | Dunham | 15—88 X |

CHARLES A. WILLMUTH, *Primary Examiner.*

E. L. ROBERTS, *Assistant Examiner.*